United States Patent [19]

Hartmann et al.

[11] Patent Number: 5,093,755
[45] Date of Patent: Mar. 3, 1992

[54] CIRCUITRY FOR DEMAGNETIZING THE MASK IN A COLOR PICTURE TUBE

[75] Inventors: Uwe Hartmann, Untergriesbach; Eduard Lohmüller; Fritz Ohnemus, both of Villingen-Schwenningen, all of Fed. Rep. of Germany

[73] Assignee: Deutsche Thomson-Brandt GmbH, Villingen-Schwenningen, Fed. Rep. of Germany

[21] Appl. No.: 378,258

[22] Filed: Jul. 11, 1989

[30] Foreign Application Priority Data

Jul. 15, 1988 [DE] Fed. Rep. of Germany ....... 3824038

[51] Int. Cl.⁵ .................... H01F 13/00; H04N 9/29
[52] U.S. Cl. ................................. 361/150; 315/8
[58] Field of Search ............. 361/149, 150, 267; 315/8; 323/239, 324; 335/284

[56] References Cited

U.S. PATENT DOCUMENTS

| | | | |
|---|---|---|---|
| 3,582,721 | 6/1971 | Hoorn et al. | 361/149 |
| 3,733,524 | 5/1973 | Cooksey et al. | 361/150 |
| 3,784,868 | 1/1974 | Shinkai et al. | 315/8 |
| 3,955,115 | 5/1976 | Manske | 315/8 |
| 4,445,072 | 4/1984 | Fredres | 315/8 |
| 4,710,697 | 12/1987 | Tardy | 323/239 |

FOREIGN PATENT DOCUMENTS 52-61914 5/1977 Japan ....................... 361/149

Primary Examiner—A. D. Pellinen
Assistant Examiner—David Osborn
Attorney, Agent, or Firm—Max Fogiel

[57] ABSTRACT

A circuit for demagnetizing a mask in a color picture tube of a television receiver, in which a resistor with positive temperature coefficient is applied to the input alternating current when the receiver is turned on. A bridge rectifier is connected with one terminal, to a first pole of the alternating current source, via the demagnetizing coil that is mounted on the picture tube, and the resistor. The bridge rectifier has another terminal connected to a second pole of the alternating current source. A variable electronic switch interconnects the direct-current output terminals of the bridge rectifier. The variable electronic switch is controlled to continuously decrease current flowing through the demagnetizing coil to zero. For this purpose, a controlling voltage is obtained from a winding in a horizontal-frequency synchronized power-intake stage by flyback rectification. A feedback circuit is connected to a delay network and to the variable electronic switch for opening the latter completely after a time interval determined by the delay network.

2 Claims, 2 Drawing Sheets

CIRCUITRY FOR DEMAGNETIZING THE MASK IN A COLOR PICTURE TUBE

BACKGROUND OF THE INVENTION

The invention concerns circuitry for demagnetizing the mask in a color picture tube by means of a demagnetizing coil mounted thereon with a series-connected resistor that has a positive temperature-coefficient (PTC) applied to the incoming alternating current when the receiver that includes the picture tube is turned on.

Known systems have a PTC resistor that is thermally connected to a similar resistor. These PTC resistors make it possible to continuously decrease over time the alternating current traveling through the demagnetizing coil to a residual current dictated by the characteristic of the resistor. The residual current can be discontinued by means of such components as a relay or TRIAC in series with the demagnetizing coil. The current is discontinued suddenly, leaving a residual field that can disrupt the uniformity of the black-and-white compensation. Aside from the expensive components it demands, this system has an additional drawback in that the PTC resistor cools off once the demagnetizing current has been discontinued and allows thereby a parameter that corresponds to the horizontal-frequency current to be induced in the deflection coil, which can also cause malfunction in the color unit.

SUMMARY OF THE INVENTION

The object of the invention is to reduce the effect of the alien field, which is especially powerful in large color picture tubes, in order to improve the electron beam's landing reserve by ensuring demagnetization of the mask, especially subsequent to as brief a zeroing in as desirable.

A characteristic advantage is that the demagnetizing current can be gradually decreased to zero without the previously conventional sudden discontinuation of a still existing residual current.

BRIEF DESCRIPTION OF THE DRAWINGS

The invention will now be described with reference to the drawing, wherein.

DESCRIPTION OF THE PREFERRED EMBODIMENTS

The system described herein demagnetizes the mask every time the equipment is turned on, even by remote control. The mask has, as is known, been demagnetized up to now by means of a double PTC resistor. Although this approach is relatively inexpensive, it functions only once the power switch has been engaged. Since the PTC resistor is hot when the equipment is in stand-by, the mask cannot be demagnetized when the equipment is turned on with the remote-control switch.

Figure 1:
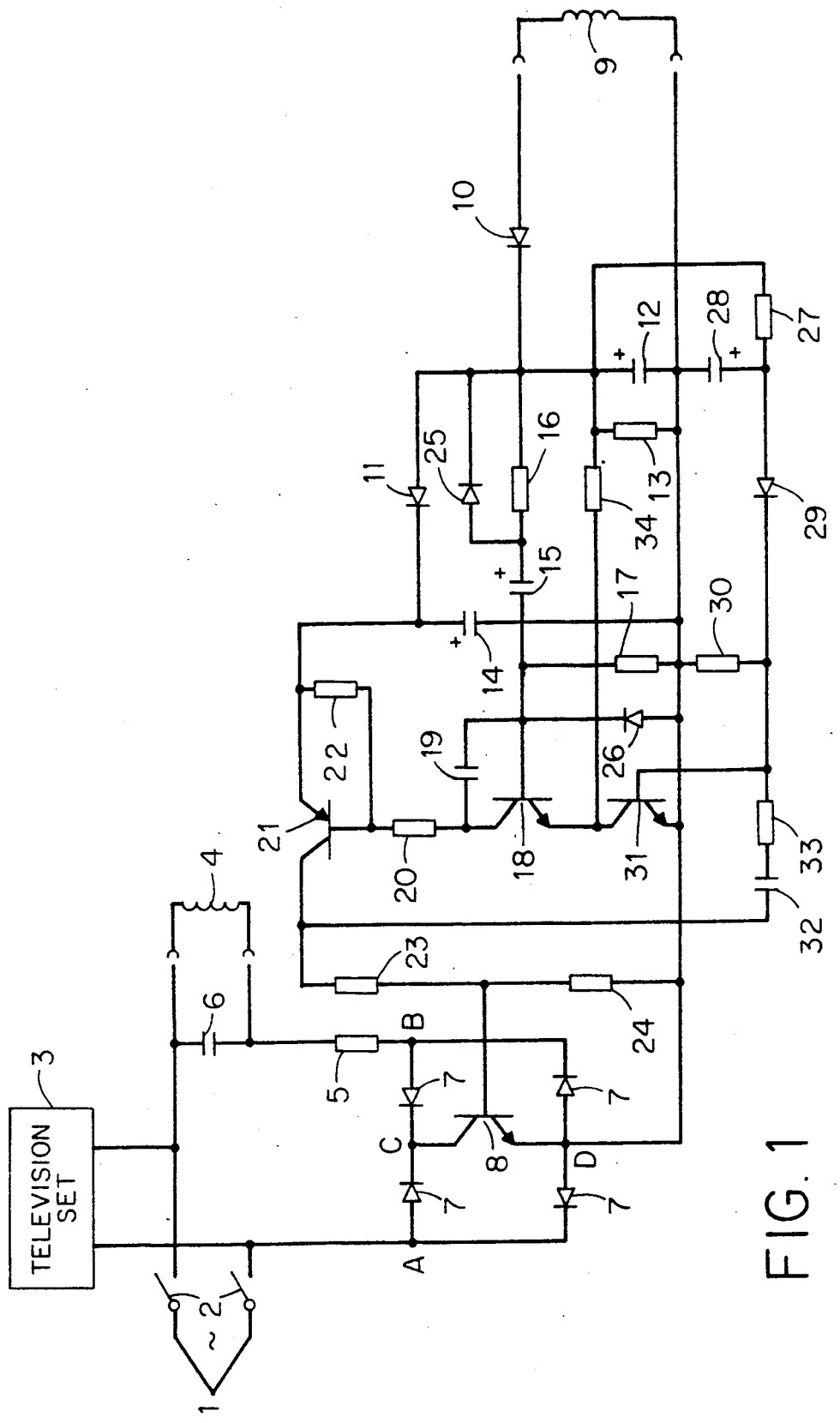
FIG. 1 illustrates demagnetizing circuitry.

Outside alternating-current voltage is supplied in FIG. 1 to a terminal 1 that obtains current by way of the on-and-switch that consists in the illustrated embodiment of a transistor 8. The transistor's collector is connected to the direct-current terminal C and its emitter to the direct-current terminal D in rectifier 7. A control circuit that will be described hereinafter is connected to its base. Transistor 8 must be operating fully saturated when the demagnetization process is initiated to ensure that its maximum collector current will be flowing and to protect the component by avoiding switching losses. The collector current cannot be reduced until it has already been decreased to a relatively low level by PTC resistor 5.

When set 3 is turned on, its line transformer supplies pulses by way of a winding 9 that are rectified by diodes 10 and 11. A direct current builds up at a capacitor 12, which is in parallel with a resistor 13, and at another capacitor 14. It is practical to rectify the line pulses from winding 9 in flyback because the flyback voltage is controlled. It is, however, also conceivable to obtain operating voltage by flyback rectification from a winding in a horizontal-frequency synchronized power-intake stage. A capacitor 15 is charged by way of a resistor 16 and of diode 10, and a gradually decreasing charging current begins to flow, forwarding a voltage that controls a transistor 18 to base resistor 17 and opening the transistor. Transistor 18 functions as a current amplifier and is line-frequency feedbacked by way of a capacitor 19. Since transistor 18 is conductive, it opens by way of a resistor 20 another transistor 21, which forwards the operating voltage that occurs at capacitor 14, is rectified by diode 11, and is transmitted by a base resistor 22 to the base of transistor 8 by way of a voltage divider 23 and 24. As capacitor 15 charges up, the voltage that controls transistor 18 decrease over time, and the voltage at voltage divider 23 and 24 will also decrease, constantly maintaining transistor 8 at a high ohmage. The consequence is an equivalent decrease in the collector current and hence of the demagnetizing current flowing through coil 4 to zero. This process takes approximately 30 seconds. Once the mask has been demagnetized, transistors 18, 21, and 8 are blocked. When set 3 is turned off, the direct current at capacitor 12 drops through its parallel resistor 13. Diodes 25 and 26 also rapidly discharge capacitor 15 by way of resistor 13. Even if the supply of power is briefly interrupted, the circuit will continue operating subject to the initial conditions, and the whole demagnetization process can be immediately repeated.

It takes the direct currents at capacitors 12 and 14 approximately 300 msec to arrive at their intended level, and the base current of output transistor 8 will accordingly also take the same time to attain its maximum and saturate the transistor. The system accordingly includes a delay component that only releases the maximum base current 500 msec later for example. The delay is produced by a timing constant established by a resistor 27 in conjunction with a capacitor 28. The voltage that builds up at capacitor 28 arrives by way of an uncoupling diode 29 at the base resistor 30 of a switching transistor 31. The transistor's emitter-to-collector section switches the emitter of transistor 18, which has up to then been connected to the potential of capacitor 12 by way of a resistor 34, over to reference potential. Once switching transistor 31 is conductive, it becomes saturated very rapidly, within 1 msec, by feedback when the voltage at the collector of transistor 21 is diverted to the base of transistor 31 by way of a capacitor 32 and a resistor 33.

Figure 2:
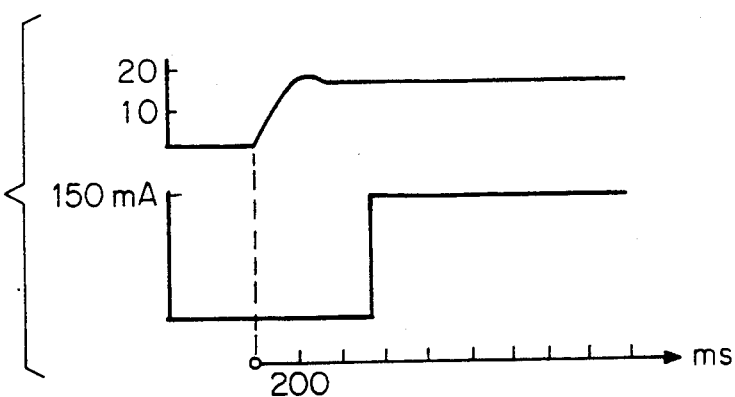
FIGS. 2 through 4 are graphs of the currents and voltages obtained by means of the circuitry and illustrate how it works.
Figure 3:
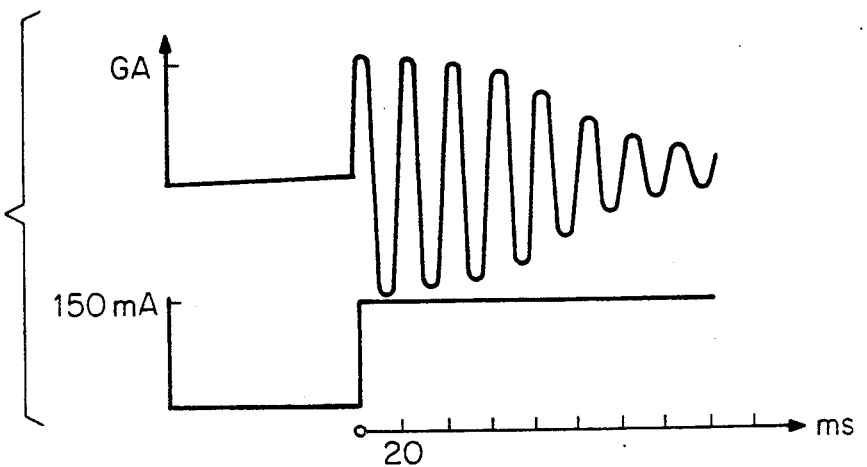
Figure 4:
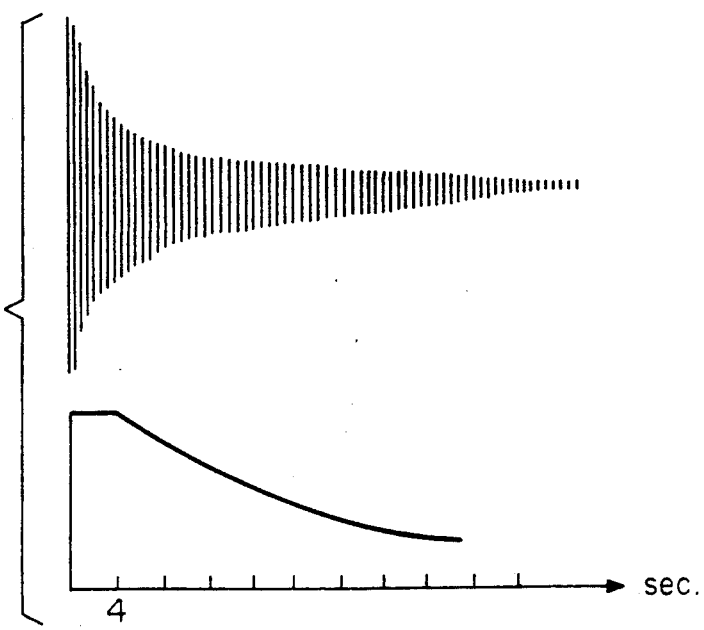

FIGS. 2 through 4 illustrate how the circuitry works.

FIG. 2 is a graph of the voltage at capacitor 14. It will be evident that it takes approximately 200 msec to attain its intended level. The curve at the bottom represents the delayed activation of transistor 8, with the complete base current taking 500 msec to come into effect.

FIG. 3 illustrates how the base current has already saturated transistor 8 by the time the collector current and hence the demagnetizing current through coil 4 begins to oscillate.

FIG. 4, with a larger-scale time frame, shows that the base current retains its maximum over a longer interval (4 seconds), during which the more powerful demagnetizing current is flowing. Only once PTC resistor 5 comes into action, is the base stream decreased until, approximately 30 seconds later, transistor 8 is completely blocked.

We claim:

1. A circuit arrangement for demagnetizing a mask in a color picture tube in a television receiver, comprising: a demagnetizing coil mounted on said color picture tube; a source of alternating current; a resistor with positive temperature coefficient applied to said alternating current when said receiver is turned on; a bridge rectifier having a first terminal connected to a first pole of said source of alternating current through said demagnetizing coil and said resistor; said bridge rectifier having a second terminal connected to a second pole of said source of alternating current; a variable electronic switch; said bridge rectifier having direct-current output terminals interconnected by said variable electronic switch; a control circuit for controlling said variable electronic switch to continuously decrease current flowing through said demagnetizing coil to zero, said control circuit having a voltage obtained from a winding in a horizontal-frequency synchronized power-intake stage by flyback rectification; delay means; a feedback circuit connected to said delay means and to said electronic switch for opening said electronic switch completely after a time interval determined by said delay means.

2. A circuit arrangement for demagnetizing a mask in a color picture tube in a television receiver, comprising: a demagnetizing coil mounted on said color picture tube; a source of alternating current; a resistor with positive temperature coefficient applied to said alternating current when said receiver is turned on; a bridge rectifier having a first terminal connected to a first pole of said source of alternating current through said demagnetizing coil and said resistor; said bridge rectifier having a second terminal connected to a second pole of said source of alternating current; a variable electronic switch; said bridge rectifier having direct-current output terminals interconnected by said variable electronic switch; a control circuit for controlling said variable electronic switch, said control circuit having a voltage for providing power to said control circuit; delay means for actuating said electronic switch and having a delay resistor and capacitor; a first transistor having a collector and being connected to said electronic switch; a second transistor with a base, said delay means being connected between said base of said second transistor and said collector of said first transistor, said voltage for providing power to said control circuit attaining a predetermined level and said second transistor becoming saturated within substantially 1 msec by feedback when voltage at the collector of said first transistor is diverted to the base of said second transistor through said delay resistor and capacitor.

* * * * *